(12) United States Patent
Lihme (10) Patent No.: US 7,368,141 B2
(45) Date of Patent: May 6, 2008

(54) PROCESS OF ISOLATING LACTOFERRIN (75) Inventor: Allan Otto Fog Lihme, Birkerød (DK)

(73) Assignee: Upfront Chromatography A/S, Copenhagen (DK)

( * ) Notice: Subject to any disclaimer, the term of this patent is extended or adjusted under 35 U.S.C. 154(b) by 421 days.

(21) Appl. No.: 10/507,136

(22) PCT Filed: Mar. 6, 2003

(86) PCT No.: PCT/DK03/00135

§ 371 (c)(1),
(2), (4) Date: Mar. 16, 2005

(87) PCT Pub. No.: WO03/073866

PCT Pub. Date: Sep. 12, 2003

(65) Prior Publication Data

US 2005/0220953 A1    Oct. 6, 2005

(30) Foreign Application Priority Data

Mar. 7, 2002    (DK) .............................. 2002 00348

(51) Int. Cl.
*A23D 9/013* (2006.01)
*A23P 1/00* (2006.01)
*C07K 1/00* (2006.01)

(52) U.S. Cl. .................. 426/531; 426/665; 530/350
(58) Field of Classification Search ................ 426/531, 426/665; 530/350
See application file for complete search history.

(56) References Cited

U.S. PATENT DOCUMENTS

| 4,791,193 A |   | 12/1988 | Okonogi et al. |
| 4,976,865 A |   | 12/1990 | Sanchez et al. |
| 5,338,553 A |   | 8/1994  | Johnson et al. |
| 5,596,082 A |   | 1/1997  | Kussendrager et al. |
| 5,783,237 A |   | 7/1998  | Sanderson et al. |
| 5,849,885 A | * | 12/1998 | Nuyens et al. ............... 530/416 |
| 6,172,040 B1 | * | 1/2001 | Naidu ........................... 514/6 |

FOREIGN PATENT DOCUMENTS

WO    WO 02/096215 A1    12/2002

OTHER PUBLICATIONS

Hoffer et al, The association of Ga-67 and lactoferrin, 1977, J Nuclear Medicine, vol. 18, pp. 713-717.*

* cited by examiner

*Primary Examiner*—Mark Navarro
(74) *Attorney, Agent, or Firm*—Birch, Stewart, Kolasch & Birch, LLP (57) ABSTRACT A process for isolating lactoferrin from milk or a casein-containing component or product containing lactoferrin, comprising subjecting a precipitate of casein obtained from the milk of the casein-containing component or product, with which precipitate at least part of the milk lactoferrin is associated, to a treatment with an extraction medium whereby at least part of the lactoferrin associated with the precipitate of casein is released to the medium. When lactoferrin has been released, the medium may be subjected to different types of purification operation steps. The purification operations are selected in accordance with the purity requirements of the intended specific application. Furthermore, lactoferrin and/or a composition comprising lactoferrin according to the above-mentioned process is provided.

28 Claims, 6 Drawing Sheets

PROCESS OF ISOLATING LACTOFERRIN

This application is a national phase under 35 U.S.C. § 371 of PCT International Application No. PCT/DK03/00135 which has an International filing date of Mar. 6, 2003, which designated the United States of America.

FIELD OF INVENTION

The present invention relates in general to the field of isolating proteins. Specifically there is provided a novel process of isolating lactoferrin from milk or any other casein-containing material.

TECHNICAL BACKGROUND AND PRIOR ART

Milk is one of the most thoroughly researched foods in history. Countless scientific papers document the composition of milk and describe the biological functionalities in this complex bio-resource. Proteins, peptides, enzymes and other biomolecular substances constitute major and very important component of milk and are believed to be responsible for many of the specific functionalities passed on from a mother to her new-born in addition to basic nutrients.

Casein is the colloidal protein constituent of milk which can be precipitated e.g. by treatment with rennet enzymes under neutral or weakly acid pH conditions or by means of a mineral salt, such as a calcium salt, or by means of acids at a pH of e.g. from 4.6 to 5.6.

Casein in milk is precipitated during a number of different dairy-related industrial processes, e.g. cheese production and casein or caseinate production.

During cheese manufacturing, the casein is precipitated by e.g. a rennet enzyme activity and the casein coagulum (cheese curd) contains entrained but soluble whey proteins, fat, lactose and minerals from milk too.

Cheese whey is a relatively dilute protein solution comprising lactose, minerals and lipids that is obtained as a by-product when producing any type of cheese by the aid of rennet enzymes and/or microbiological starter cultures.

In the past two decades, there has been a significant focus on utilisation of whey proteins e.g. bovine whey proteins from milk. Today, several bovine Whey Protein Concentrates (WPC) and bovine Whey Protein Isolates (WPI) are standard products obtained through various membrane filtration techniques as well as ion exchange adsorption procedures.

Further utilisation of the bovine whey in terms of fractionation of the proteins into individual protein fractions, such as β-lactoglobulin, α-lactalbumin, immunoglobullns, lactoperoxidase, and lactoferrin, is made possible through chromatographic packed bed and expanded bed separation techniques. Protein products from chromatographic separation technologies are generally characterised by their low- to non-fat content and are useful for a broad range of applications e.g. within foods, feeds, functional foods, and health care products.

Since the first market introductions of WPC and WPI products and more recently, the first purified single protein products comprising lactoferrin, an ever increasing demand for even more sophisticated and still more efficient and cost effective production processes has evolved.

Lactoferrin is a metallo-protein found naturally within biological fluids, such as milk and saliva, at mucosal surfaces and within white blood cells at relatively low concentrations. Besides working as a transmitter molecule in iron assimilation for the infant, lactoferrin has an antibacterial functionality towards iron-dependent microorganisms.

Due to its antibacterial, anti inflammatory and immune modulating properties, lactoferrin offers promising new applications, for example in the treatment of diseases, commonly difficult to treat with antibiotics.

Thus a broad range of activities and applications of products comprising lactoferrin have been suggested:

Natural antibiotic activity—killing many disease causing bacteria, whilst protecting the natural bacterial flora of the body.

Immune-boosting activity—lactoferrin aids in maturation and regulation of a number of immune competent cells throughout the body.

Antioxidant activity—the strong binding of iron by lactoferrin, prevents "free iron" from forming free radicals. Free radicals have been implicated as a causative agent in many diseases including cancers.

Antifungal activity—Lactoferrin kills a range of fungi and yeast, including the causative agent of thrush, Candida albicans.

Research in antiviral agents has shown that lactoferrin can prevent viruses, such as HIV, hepatitis and CMV, from binding to the cells of the body and thus preventing viral infection.

Antitumour activity—lactoferrin and related peptides have been shown to suppress tumour growth and prevent tumour formation in animal models.

Iron uptake—As lactoferrin binds very tightly to iron, lactoferrin is believed to allow efficient uptake of iron into the body. This is considered as being beneficial for anaemic patients.

Furthermore, treatment of meat surfaces with lactoferrin solutions to inhibit bacterial growth and thereby minimise the risk of food contamination and prolong shelf life of certain food products has been suggested as an important future application of lactoferrin.

The concentration of lactoferrin in bovine skimmed milk is usually small, typically between 80-200 mg/ml depending on e.g. the pasteurisation and other pre-treatment history of the skimmed milk. After precipitation of the casein present in milk, the concentration of lactoferrin in bovine whey is typically between 10-100 mg per litre depending on the physical and chemical pre-treatment of the whey.

Thus, there is a need for an effective, simple and cost effective large scale process to enable an industrial production of lactoferrin products to be used in various applications.

During manufacturing of certain cheese products the cheese curd is washed with a salt solution or solid salt is added to the cheese curd which leads to the separation of a protein containing extract. The addition of salt or saturated salt solution to the cheese curd results in syneresis of the curd causing expulsion of water, whey components (fat, protein, lactose, etc) and some salt.

Regarding the nature of such an extract, U.S. Pat. No. 5,783,237 discloses such an extract that is discharged even though it contains valuable milk and whey components since it cannot be usefully reprocessed because of the high salt content and it is difficult to dispose of because of its high Biological Oxygen Demand (BOD) and salinity level.

Thus, the extract is at many production sites regarded as a waste product that has little or no value and in most instances it is a problem to discard the product. Furthermore, it seems to be a general observation that the extract cannot be further processed to take advantage of any valuable compounds present therein due to the high salt concentration.

Casein and caseinates are generally produced from skimmed milk. It is precipitated by treating milk with a destabilising agent, such as an acid, a mineral salt or rennet and then separated from the residual whey by means of a separator or filter. It is then typically washed with large quantities of water and dried.

U.S. Pat. No. 4,976,865 discloses a method of separating biological macromolecules by using packed bed chromatography as well as expanded bed chromatography which is economically feasible to provide an industrial scale production. The compounds are primarily obtained from natural products such as milk. In particular, the method disclosed may be applied to the chromatographic separation of whey proteins, specifically are β-lactoglobulin and α-lactalbumin are extracted from a "mild" whey i.e. whey without increased salt concentration or ionic strength. For elution of β-lactoglobulin and α-lactalbumin a 0.1N hydrochloric acid solution is used. The method does not disclose isolation and purification of lactoferrin. Furthermore, the whey used for isolation and purification of whey proteins is a mild whey and the use of an extract obtained from the treatment of precipitated casein with a salt or a salt solution has not been disclosed.

U.S. Pat. No. 4,791,193 discloses a process for producing lactoferrrin with a high purity from a bovine source. It is disclosed that in spite of the useful physiological functions of lactoferrin, it has been difficult to isolate and purify lactoferrin from milk at an industrial scale because of its minor proportion in milk. The milk used in this invention is in the form of either skimmed milk or as whey. The patent discloses a process utilising a solution of one or more salts selected from the group consisting of sodium chloride, potassium chloride, calcium chloride and magnesium chloride for eluting the whey protein, lactoferrin, captured by a weakly acidic cation-exchanger. The concentrations of the salt solutions applied for elution are in the range of 0.4-2.5 and 1.5-12. U.S. Pat. No. 4,791,193 does not disclose use of an extract for isolation of whey proteins such as lactoferrin. Additionally, the process does not disclose the preparation of an extract obtained from the precipitated milk casein for the refinement of lactoferrin.

U.S. Pat. No. 5,596,082 discloses a process for isolating lactoferrin and lactoperoxidase from milk and milk products and products obtained by such a process. In particular, a process is disclosed for isolating lactoferrin and lactoperoxidase from milk at an industrial scale. The starting material used is whey from cheese manufacturing or neutralised casein whey at pH 6.5 obtained from skimmed milk after casein precipitation. Lactoferrin and lactoperoxidase are adsorbed to a cation exchanger at a high surface velocity and subsequently eluted from the cation exchanger with a salt solution. This patent does not disclose the use of an extract for refining whey proteins such as lactoferrin. Additionally, the process does not disclose the preparation of an extract obtained from the precipitated milk casein for the isolation of lactoferrin.

The above-mentioned processes are based on known chromatographic techniques wherein a lactoferrin-containing liquid passes a solid phase designed to capture lactoferrin by a selective binding.

A disadvantage of the known production processes for lactoferrin is the relatively low concentration of the lactoferrin naturally present in milk and whey raw materials. This implies that large volumes of liquid must be treated in order to produce a certain amount of lactoferrin. The relatively high concentration of other milk/whey proteins makes it challenging and relatively expensive to obtain a product with a high degree of lactoferrin purity.

Furthermore, the preparation of an extract obtained from the precipitated milk casein for the isolation of lactoferrin has not been disclosed in the prior art.

The inventors of the present invention surprisingly found that treatment of the precipitated casein, from e.g. cheese manufacturing, may result in an extract containing an elevated concentration of lactoferrin relative to traditional whey obtained as a waste product in e.g. cheese manufacturing. This lactoferrin-enriched extract is suitable for an efficient recovery of lactoferrin or alternatively, directly applicable in low cost applications on wet or dry basis.

Thus, by providing a process according to the present invention it has become possible to recover whey proteins, such as lactoferrin, in a manner which is cheap, specific, more efficient, easily performed and the invention is easily compatible with automated and semi-automated systems.

SUMMARY OF THE INVENTION

Accordingly, it is a primary objective of the present invention to provide a process for isolating lactoferrin from precipitated casein obtained from milk or any other casein-containing component or product. During said casein precipitation, proteins, fat, lactose and other soluble components are associated to the precipitated casein structure. One of the soluble proteins entrapped in the precipitated casein is lactoferrin. This protein may be extracted by using a specifically designed extraction medium comprising a salt, acid or base or a combination hereof to release the soluble lactoferrin to the medium.

When lactoferrin has been released, the medium may be subjected to further steps of purification operations depending on the nature of which depends on the planned application of the isolated lactoferrin. The purification operation steps are selected in accordance with the purity requirements of the specific intended application.

It is an object of the present invention to provide a simple and low cost process for the industrial production of lactoferrin from milk or a casein-containing component or product containing lactoferrin. Thus, it is an object of the present invention to provide lactoferrin products at relatively low costs to enable commercial uses of such products that have hitherto been inhibited by high production costs and also to provide added value products derived from the extract and thereby allow for more efficient use of the natural resources.

Additionally, it is an object of the present invention to provide a cost effective process for production of lactoferrin products from an extract obtained from precipitated casein and other liquid fractions that may be obtained in the context of any type of industrial casein precipitation.

Accordingly, in the broadest aspect of the present invention a process is provided for isolating lactoferrin from milk or a casein-containing component or product containing lactoferrin, comprising subjecting a precipitate of casein obtained from the milk or the casein-containing component or product, with which precipitate at least part of the milk lactoferrin is associated, to a treatment with an extraction medium whereby at least part of the lactoferrin associated with the precipitate of casein is released to the medium.

It is a further aspect of the present invention to provide lactoferrin and/or a composition comprising lactoferrin according to the above-mentioned process.

DETAILED DISCLOSURE OF THE INVENTION

In the present context the term "casein" relates to a protein mainly found in milk, the casein may be naturally or synthetically produced and may be precipitated in a form where it is associate with lactoferrin.

At least under certain pH and ionic strength conditions a part of the lactoferrin present in the milk is loosely associated with casein, when it is precipitated by a treatment of the milk e.g. during production of cheese or caseinates. It is assumed that this association of lactoferrin is preferential in relation to the other soluble milk proteins that stay in solution during casein precipitation and are subsequently found in the liquid whey fraction.

In the present context, the term "precipitation" or "precipitate" relates to any kind of joining between casein particles. The joining may be by actions such as electrostatic action, ionic interaction, covalent interaction and formation of hydrogen bonds. The joining between the particles may provide a solid.

The process of precipitating casein may be initiated by changes in pH and/or temperature of the milk or a casein-containing component or product and/or by adding a coagulating agent hereto. The coagulating agent may be selected from the group of agents consisting of rennet, microorganisms, salts, acids and bases.

In the present context, the term "milk or a casein-containing component or product" relates to milk in the form of skimmed milk, dried milk powder, fully natural milk or any type of low fat milk. It may also be a microfiltrated milk wherein the casein is enriched (the retentate) relative to the whey proteins that are passing through the microfilter (the permeate) but also concentrated milk e.g. skimmed milk concentrated by membrane filtration or any kind of composition comprising casein. The milk or the casein-containing component or product may be either a solid or a liquid.

The milk or the casein-containing component or product are suitable raw materials in the production of lactoferrin according to the invention and the milk or a casein-containing component or product may be collected from an animal or a transgenic animal capable of producing human lactoferrin in their milk. The animal or the transgenic animal may e.g. be selected from the group consisting of herd animals, cows, camels, buffaloes, pigs, horses, deer, sheep, goats, dogs and cats. In the case where the product may be produced by a transgenic animal, according to the invention the milk or the casein-containing component or product will comprise human lactoferrin.

In the present context, the term "associated" relates to the manner in which latcoferrin is connected or bound to the casein precipitate so that lactoferrin is retained from leaving the precipitated casein. This connection may be provided by adsorbtion or fixation in any other way of lactoferrin to the precipitated casein, or lactoferrin may be entrapped or captured within the precipitated casein structure.

In the present invention "artificial milk" wherein soluble casein has been added to e.g. a liquid whey fraction obtained from an independent source can be used. In this case the liquid whey fraction may be a concentrated and optionally a desalted whey fraction.

Assumed herein the term "artificial milk" relates to separate casein components or casein products naturally or synthetically produced which may be precipitated and used to associate with lactoferrin.

In one embodiment of the present invention, the casein is added to a liquid whey fraction as an insoluble form of casein still able to associate with lactoferrin. The casein may be separated from the whey, regenerated and recycled several times in the same way as an ion exchanger might be used in many processes.

In principle, any type of casein precipitate leading to an association of lactoferrin according to the invention may be applied. Methods of casein precipitation is typically based on treating the milk with a destabillsing agent, such as an acid, a mineral salt or a rennet enzyme e.g. chymosin and/or pepsin or other proteolytic enzymes. Furthermore, microorganisms producing various proteolytic enzymes may be used for precipitation of the milk caseins.

When acid precipitation is carried out a low cost mineral acid such as hydrochloric acid, phosphoric acid and sulfuric acid is preferred. However, food grade organic acids such as acetic, citric and lactic acid may be particularly preferred. The pH of the milk is preferably adjusted to or below the point of casein precipitation which would typically take place in the range of pH 6 to pH 4 depending on the presence of any additives in the milk.

In a preferred embodiment of the present invention, the optimal adsorption or other type of fixation of lactoferrin to the casein precipitate takes place in the pH range of 4-7, e.g. in the range of 4.5-6.5, such as in the range of 5-6.

The highest optimal association of lactoferrin to the casein precipitate takes place at the lowest possible ionic strength.

In one preferred embodiment of the present invention the ionic strength is kept at or close to the ionic strength of the native milk. However, still more preferred is an ionic strength in the range of 1-75% of the native milk and most preferred is an ionic strength in the range of 1-25% of the native milk for the association of lactoferrin to the precipitated casein or any other kind of ion exchange system.

When the casein or parts of the casein present in the milk or a casein-containing component or product are precipitated the remaining liquid, whey, comprises soluble proteins, fat, lactose and other whey components. This precipitated casein is separated from the whey and is contacted with a washing solution to wash out at least part of undesired entrained whey proteins, fat and lactose from the precipitated milk casein and the washing solution is subsequently drained off the precipitated milk casein.

This washing procedure of the casein precipitate is an optional step and in a preferred embodiment of the present invention, the optional washing procedure is based on an aqueous washing solution that does not interfere with the association of lactoferrin with the casein precipitate. The washing solution is typically selected from the group consisting of tap water, demineralised water, filtered tap water, diluted salt solutions, diluted buffer solutions or combinations hereof. Lactoferrin associates with the precipitated casein is subsequently released from the casein precipitate by contacting the precipitated casein with an extraction medium. The resulting separated lactoferrin intermediate will be of a significantly higher purity than without the washing step and the separated lactoferrin intermediate may require a less intensive refinement procedure in order to obtain a proper lactoferrin product.

In a preferred embodiment of the present invention, the washing solution comprises a dilute salt solution selected from the group consisting of sodium chloride or any other low cost, food grade mineral or organic salt at a concentration less than a concentration capable of releasing the lactoferrin from the casein precipitate. The concentration of the dilute salt solution is typically at the most 0.1 N, at the most 0.05 N or at the most 0.02 N.

In another preferred embodiment of the present invention the washing solution comprises a dilute buffer solution which comprises acetic, citric, lactic or any other organic acid buffer of low cost and food grade quality at a concentration of at the most 0.1 N, at the most 0.05 N or at the most 0.02 N.

In a preferred embodiment of the present invention, the washing solution can be tailor-made in order to obtain a high-grade stream of lactoferrin. Initially, the precipitate is washed with a buffer to release other milk-derived molecules. Subsequently, the precipitate is washed with a buffer to release lactoferrin in a purer state. This buffer can be a salt containing buffer or a buffer with a specific pH value or a buffer containing a specific composition to release the lactoferrin selectively. In this way, a purer lactoferrin is obtained and the number of unit operations necessary to isolate lactoferrin may be limited.

Subsequently, it was surprisingly found that precipitated casein is able to associate with lactoferrin and precipitated casein becomes available to the production of lactoferrin products by releasing lactoferrin from the casein precipitate by the aid of an extraction medium. In the present context, the term "extraction medium" relates to the medium that leads to the release of lactoferrin adsorbed or fixed to a casein precipitate.

The extraction medium may be any type of liquid or solid capable of releasing associated lactoferrin from a casein precipitate.

In a preferred embodiment of the present invention, the extraction medium provides a change In one or more of the parameters selected from the group consisting of pH, ionic strength, salt content, hydrophobicity, charge, temperature and pressure. This change may be obtained by using an extraction medium selected from the group consisting of inorganic and organic salts, acids or bases. In a preferred embodiment of the present invention, the extraction media contains inorganic salts of food grade such as sodium chloride, potassium chloride, calcium chloride, sodium sulphate; organic salts such as sodium acetate, sodium citrate, sodium lactate and acids such as hydrochloric acid, phosphoric acid, sulphuric acid, acetic acid, citric acid and/or lactic acid.

The properties of the extraction medium may be influenced by changing one or more of the above mentioned parameters. These changes may influence the conductivity of the extraction medium. In the present context the term "conductivity" relates to the ability of the extraction medium to conduct an electrical current. In an embodiment of the present invention, the extraction medium after extraction of precipitated casein has a conductivity of at least 5 mS/cm, such as at least 10 mS/cm, e.g. at least 20 mS/cm, such as at least 30 mS/cm, e.g. at least 50 mS/cm, such as at least 75 mS/cm, e.g. at least 100 mS/cm, such as at least 125 mS/cm, e.g. at least 150 mS/cm, such as at least 200 mS/cm, e.g. at least 300 mS/cm.

In a preferred embodiment of the present invention, the extraction medium employed is a salt and the salt is added to the casein precipitate either as a solid or as a salt solution. When the salt is added as a solid the resulting syneresis will lead to the separation of a liquid wherein the released lactoferrin may be found. The addition of solid salt would result in a final salt concentration in the separated liquid in the range of 0.01-5N, such as 0.05-5N, e.g. 0.1-4N, such as 0.1-3N, e.g. 0.1-2N, such as 0.1-1.5N, e.g. 0.1-1N, such as 0.2-3N, e.g. 0.3-3N, such as 0.2-1.5N, e.g. 0.2-1.2N such as 0.3-1.5N, e.g. 0.3-1N. When the salt is added as a salt solution, the salt solution has a concentration in the range of 0.01-5N, such as 0.05-5N, e.g. 0.1-4N, such as 0.1-3N, e.g. 0.1-2N, such as 0.1-1.5N, e.g 0.1-1N, such as 0.2-3N, e.g. 0.3-3N, such as 0.2-1.5N, e.g. 0.2-1.2N such as 0.3-1.5e.g. 0.3-1N.

In another preferred embodiment of the present invention the extraction medium comprises an acid and the resulting pH of the liquid extracted and separated from the casein precipitate after contacting with the acid is in the range of pH 1-5, such as pH 1-4.5, e.g. pH 2-4, such as pH 2-3, e.g. pH 3-4.

Alternatively, the extraction medium may be applied directly to the precipitated casein without prior washing of the casein precipitate. In this case, the extraction medium may contains the soluble whey proteins, lipids and lactose which have also been entrained in the casein precipitate together with the released lactoferrin. In this instance, a lactoferrin intermediate will be more impure and may require a more intensive refinement procedure in order to obtain a proper lactoferrin product. However, it has been found that even so the lactoferrin intermediate will be significantly enriched in respect of lactoferrin relative to the lactoferrin present in the ordinary liquid whey fraction that is used for lactoferrin production in the processes disclosed in the prior art.

The extraction medium comprising the released lactoferrin is separated from the casein precipitate as a lactoferrin intermediate and the lactoferrin may be isolated from the extraction medium to obtain a lactoferrin product.

Separation and collection of the liquid lactoferrin intermediate from the casein precipitate will be performed by using methods known per se e.g. draining, centrifugation, filtering, filter pressing.

In a preferred embodiment of the present invention, the subjecting of the precipitated casein to fresh extraction medium may be repeated one or several times to ensure an optimal recovery of lactoferrin entrapped within the casein precipitate.

The isolation methods chosen to obtain a lactoferrin product will depend on the quality specifications for a particular use or of the particular lactoferrin product. Thus, applications within health care and pharmaceutical applications are likely to require very high purity of the lactoferrin product while other applications such as the treatment of meat surfaces to inhibit bacterial growth may have significantly lower demand for high purity lactoferrin products.

The isolation methods used in the present invention may thus be chosen among the methods known per se for isolating a crude product intermediate to a final, stabilised product with known standardised quality characteristics. These methods may be used alone or in combination and include unit operations such as:

clarification comprising e.g. filtration, membrane filtration, centrifugation, sedimentation or a any combination hereof, concentration comprising e.g. membrane filtration including ultrafiltration, nanofiltration, reversed osmosis, evaporation and precipitation methods or any combination hereof, and purification comprising e.g. adsorption techniques including ion exchange, hydrophobic adsorption, affinity adsorption, mixed mode ligand adsorption and metal chelate adsorption, gel filtration and/or precipitation methods or any combination hereof.

The purification operation may be performed in either an expanded bed mode and/or in a packed bed mode.

In a preferred embodiment of the present invention, the linear flow rate of the extraction medium when loaded on to the chromatography column is at least 3 cm/min, such as at least 5 cm/min, e.g. at least 8 cm/min, such as at least 10 cm/min, e.g. at least 15 cm/min, such as at least 20 cm/min, e.g. at least 25 cm/min, such as at least 50 cm/min, e.g. at least 100 cm/min.

In yet another embodiment of the present invention, the adsorbent binds lactoferrin from the extract medium after extraction of the precipitated casein (ml extract per ml adsorbent) in a ratio of at least 1:5, such as at least 1:10, e.g. at least 1:20, such as at least 1:30, e.g. at least 1:40, such as at least 1:50, e.g. at least 1:60, such as at least 1:75, e.g. at least 1:100, such as at least 1:150, e.g. at least 1:200, such as at least 1:300.

In a preferred embodiment of the present invention the isolation of lactoferrin may be performed by either a batch operation or by a continuous operation.

In order to isolate lactoferrin from the extraction medium the resin used in the adsorption technique is generally equilibrated to favour adsorption or fixation of lactoferrin to the resin. In a preferred embodiment of the present invention the resin present in the adsorption technique is equilibrated to a pH range of pH 3-7, such as pH 3.5-6.7, e.g. pH 4-6.6, such as pH 4.5-6.5, e.g. pH 5-6.4, such as pH 5-6.

Elution of the adsorbed lactoferrin from the resin used in the adsorption technique is obtained by increasing the pH. In a preferred embodiment of the present invention the pH for elution of lactoferrin is in the range of pH 8-13, such as pH 8.5-12, e.g. pH 8.5-11, such as pH 9-10, e.g. pH 9.5-10.

In the present context, the term "elution" relates to the liquid used to release lactoferrin adsorbed or fixed to a resin used in an adsorption technique.

In a preferred embodiment of the present invention, the amount of lactoferrin isolated relative to the amount of lactoferrin present in the milk or a casein-containing component or product before casein precipitation, is at least 5%, at least 10%, at least 20% at least 30%, at least 40%, at least 50%, at least 60%, at least 70%, at least 80%, at least 90% at least 92%, at least 94%, at least 95%, at least 97% or at least 100%.

In another preferred embodiment of the present invention, the isolation of lactoferrin present in the precipitated casein is at least 5%, at least 10%, at least 20% at least 30%, at least 40%, at least 50%, at least 60%, at least 70%, at least 80%, at least 90% at least 92%, at least 94%, at least 95%, at least 97% or at least 100%.

Alternative procedures for isolation of lactoferrin from an extraction medium as provided by the present invention may easily be developed e.g. the procedure disclosed in the co-pending Danish patent application No. PA 2001 00869 may be applied for isolation of lactoferrin and this application is hereby incorporated by reference.

In a preferred embodiment of the present invention, lactoferrin is isolated from a casein precipitate obtained from the dairy industry.

In another preferred embodiment of the present invention, lactoferrin is isolated from a casein precipitate, said casein precipitate is obtained from a casein and/or caseinate production and/or from a cheese production.

Stabilisation methods are provided for optimising the storage stability of the final lactoferrin product in terms of bacterial growth, minimising the deterioration due to protease activities and general chemical instability of the product.

In a further preferred embodiment of the present invention, a standardisation of the lactoferrin product is performed in terms of e.g. component concentration, lactoferrin activity and colour of the product.

Lactoferrin prepared according to the process of the present invention may be applied in a wide array of known applications ranging from low cost food additive to high value pharmaceutical applications.

The extract medium may after extraction of lactoferrin from the precipitated casein, be used directly as a lactoferrin product, or the extract medium may be subjected to sterilisation and/or a minimum of additional preparation steps and subsequently be used, for preservation of food products preferably meat products.

The present invention will be further illustrated in the following figures and non-limiting examples.

EXAMPLES

Example 1

Isolation of Lactoferrin from Precipitated Skim Milk.

Skim milk pasteurised at 72° C. was adjusted to pH 4.5 with 1N HCl under thorough stirring and left overnight at 4-8° C. to let the precipitated caseins sediment.

The next day most of the supernatant (S1) was removed by decanting and a sample of the loose precipitate (10 ml) was withdrawn of the casein precipitate and centrifuged for 5 minutes at 2000 G.

The supernatant (S2) from the centrifuged sample was removed and the casein pellet (approx 2 ml) was washed by adding 8 ml 10 mN sodium acetate buffer pH 4.5, mixed carefully with the precipitated casein followed by repeated centrifugation for 5 minutes at 2000 G. The wash with sodium acetate buffer was repeated twice and the supernatants from the washing steps were labelled S3 and S4.

After the second wash the casein pellet was added 1 ml 3N NaCl to get a final concentration of 1N NaCl and following thorough mixing the sample was centrifuged for 5 minuets at 2000 G and the supernatant (S5) was removed.

All samples S1-S5 were analysed by SDS polyacrylamide electrophoresis (SDS PAGE) to detect and estimate the amount and purity of lactoferrin present in each sample.

SDS Page

For SDS PAGE, invitrogen SDS Page 4-20% Tris-Glycine gel (cat no. EC6025) was used. Sample preparation: 25 µl sample and 25 µl sample buffer Tris-Glycine Invitrogen (cat no. LC2676) was mixed and boiled for 5 minuets in a water bath. The running buffer 0.024M Tris (Sigma T1378), 0.19M Glycine (Merck 5001901000), 0.1% SDS (Sodium dodecyl sulphate, JT Baker 2811) pH 8.6 was added.

20 µl sample was applied in each analysis slot and the power was adjusted to give a current of 40 mA. When the blue line from the sample buffer reached one cm from the bottom of the gel the power was turned off and the gel was stained overnight in Invitrogens Colloidal Blue Staining Kit (cat. no. LC 6025) on a shaking table. The next day the gel was transferred into water and de-stained in water for 2 hours.

Results

Figure 1:
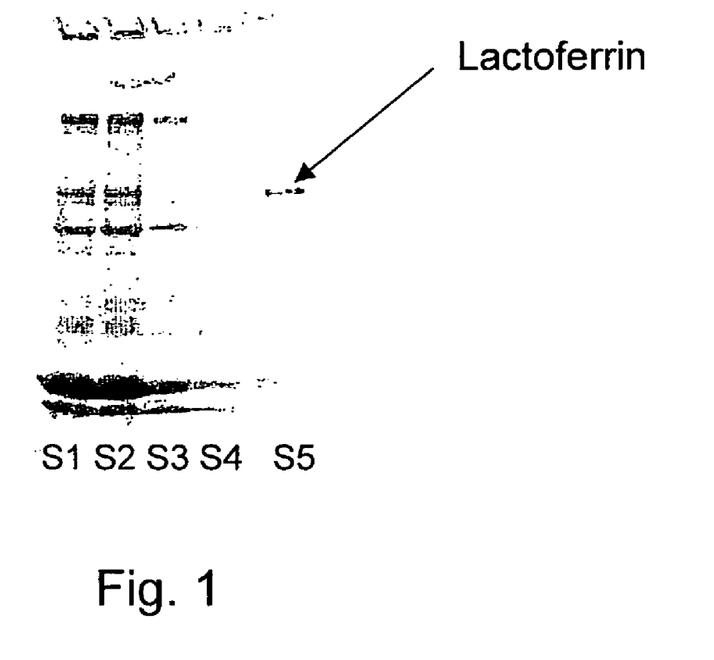
FIG. 1 shows the protein composition analysed by SDS-PAGE of lactoferrin. S1 shows the supernatant removed by decanting after precipitation of the casein, S2 shows the supernatant obtained after centrifugation of the precipitated casein, S3 and S4 shows the supernatant of two washing operations and S5 shows the extraction buffer comprising 1N NaCl removed by centrifugation.
Figure 2:
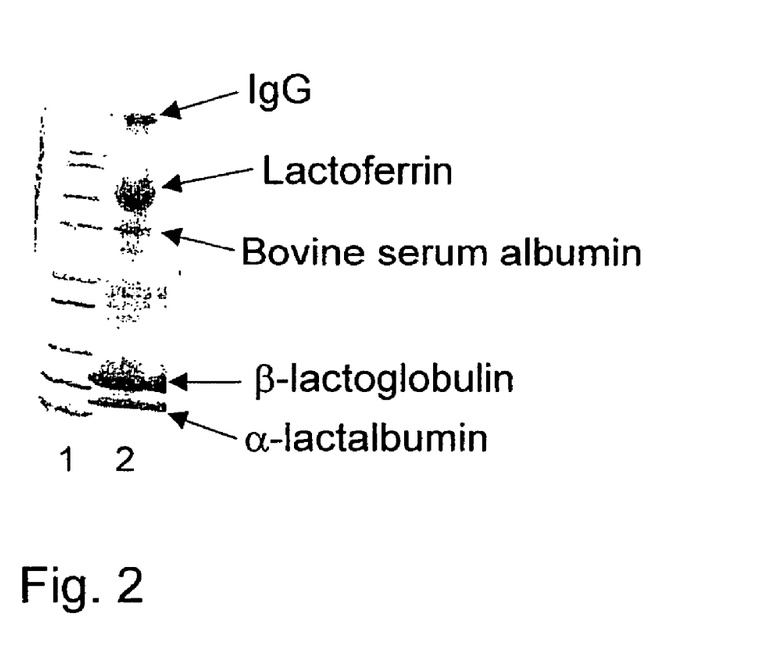
FIG. 2 shows the protein composition of the extraction medium after extraction of the precipitated casein analysed by SDS-PAGE. Lane 1 shows a molecular weight marker and lane 2 shows the extraction medium after extraction of the precipitated casein.

From the SDS PAGE, FIG. 1, it is clearly seen that lactoferrin is selectively retained in the casein precipitate when washing with 10 mN sodium acetate pH 4.5 and is released (eluted) into the 1N sodium chloride solution after washing. The eluted lactoferrin (S5) has a significantly higher purity relative to other milk/whey proteins than the purity in the liquid whey fraction (S1) obtained after precipitation of the caseins.

Example 2

Isolation of Lactoferrin from the Extract Medium After Extraction of the Precipitated Casein, by Using Packed Bed Chromatography.

Refining of the extract medium after extraction of the precipitated casein comprising lactoferrin (LF) with packed bed adsorbent chromatography:

The extract medium after extraction of the precipitated casein was obtained from a local cheese production and where analysed to have a pH of 5.5 and a conductivity of 54.5 mS/cm.

As can be seen on the analysis result the extract medium after extraction of the precipitated casein has a very high concentration of lactoferrin (compare e.g. to whey as obtained from skim milk in example 1, FIG. 1. Lane 1).

Experiments were performed to isolate lactoferrin by adsorption chromatography from the extract medium after extraction of the precipitated casein at three different pH-values.

Adsorbent

XpressLine Pro A, UpFront Chromatography A/S,

The adsorbent comprises an aromatic acid ligand and generally binds proteins in the pH-range of pH 4 to 6 and the bound proteins are released by increasing the pH to 9-10 in an elution buffer.

Pre-Treatment of the Extract Medium After Extraction of the Precipitated Casein

The extract medium after extraction of the precipitated casein was passed through Celite filter help (fine grade) to remove particulate matter. The pH in salt the extract was adjusted to respectively pH 4.9, pH 4.5 and pH 4.0 with 1N hydrochloric acid.

The experiments were performed in packed bed columns (Ø=0.5 cm).

The columns were packed with 1 ml of adsorbent and equilibrated with demineralised water.

The extract medium after extraction of the precipitated casein (having different pH values) was loaded onto three individual columns with a linear flow rate of 5 cm/min.

The respective columns were washed with 10 ml demineralised water.

Bound impurities were eluted with 10 ml 10 mN sodium citrate, 0.04 mg/ml sodium dodecylsulphate (SDS) pH 5.75.

The lactoferrin was eluted from the resin with 10 ml 20 mN sodium hydroxide.

Figure 3:
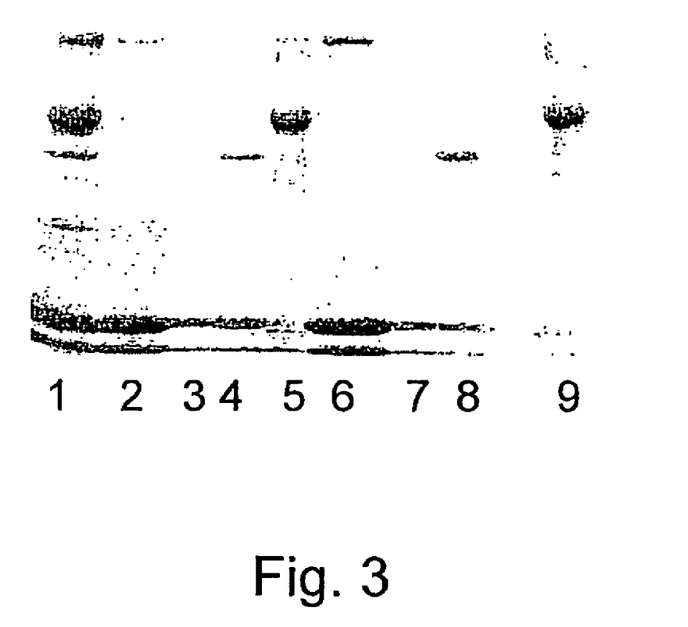
FIG. 3 shows the isolation of lactoferrin at pH 4.0 and 4.5. Lane 1 shows the extraction medium after extraction of the precipitated casein, lane 2 shows a flow through fraction at pH 4.0, lane 3 shows the supernatant from a wash with water, lane 4 shows the supernatant from a wash with SDS buffer, lane 5 shows the eluted lactoferrin, lane 6 shows a flow through fraction at pH 4.5, lane 7 shows the supernatant from a wash with water, lane 8 shows the supernatant from a wash with SDS buffer, lane 9 shows the eluted lactoferrin.
Figure 4:
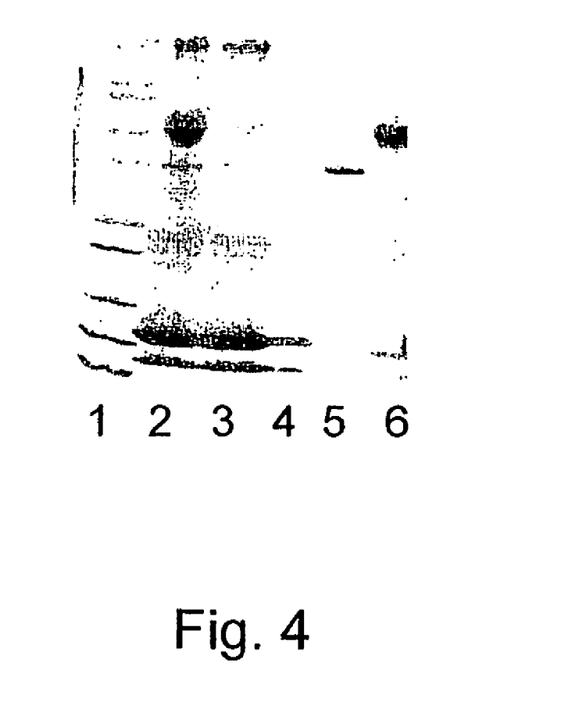
FIG. 4 shows the isolation of lactoferrin at pH 4.9. Lane 1 shows a molecular weight marker, lane 2 shows the extraction medium after extraction of the precipitated casein, lane 3 shows a flow through fraction at pH 4.9, lane 4 shows the supernatant from a wash with water, lane 5 shows the supernatant from a wash with SDS buffer, lane 6 shows the eluted lactoferrin.

The content of protein in each fraction was determined with SDS-PAGE (non-reduced, 4-20% tris-glycine gradient gel, Coomassie stained). See FIGS. 3 and 43 below.

Results

The protein concentration in the eluates has been measured spectrophotometrically at 280 nm:

| Load pH | OD 280 nm in eluate | mg LF in eluate | Purity |
|---------|---------------------|-----------------|--------|
| 4.0 | 2.66 | 12 | ++ (approx. 60%) |
| 4.5 | 2.36 | 16 | +++ (approx. 75%) |
| 4.9 | 1.84 | 15 | ++++ (approx. 90%) |

Calculation of amount lactoferrin in eluate:

$$(OD\ 280\ \text{in eluate} \times \text{volume of eluate} \times \text{purity}) / OD_{0.1\%,\ 280\ nm}\ OD_{0.1\%,\ 280\ nm} = 1.1$$

The adsorbent binds lactoferrin from the extract medium after extraction of the precipitated casein in a ratio of at least 1:20 (20 ml extract per ml adsorbent). The capacity of the adsorbent towards LF increases when pH increases from pH 4.0 to 4.9.

The purity of the product (lactoferrin) increases when the binding pH goes from 4.0 to 4.9.

The resin binds bovine serum albumin (BSA) at all three pH values. It is possible to wash out BSA with 10 mN sodium citrate, 0.04 mg/ml sodium dodecylsulphate (SDS) pH 5.75.

The resin binds a minor fraction of β-lactoglobulin (β-LG) at pH 4.0 and 4.5 but not at 4.9.

Example 3

Isolation of Lactoferrin from the Extract Medium After Extraction of the Precipitated Casein, by using Expanded Bed Adsorption.

Refining of the extract medium after extraction of the precipitated casein comprising lactoferrin (LF) with expanded bed adsorption chromatography at 25° C.:

An extract medium after extraction of precipitated casein was obtained from a cheese production facility and was analysed to have a pH of 5.6 and a conductivity of 53 mS/cm. The extract medium was obtained by washing the initially obtained cheese curd (precipitated casein) with a solution of sodium chloride whereby a solution of lactoferrin enriched salty whey was obtained by draining.

Adsorbent

FastLine SALTO, product number 1233-0100 UpFront Chromatography.

The adsorbent is agarose based with tungsten carbide particles incorporated resulting in a density of approximately 2.8 g/ml. The particle size is in the range of 40-200 µm.

The adsorbent comprises an aromatic acid ligand and generally binds proteins in the pH range of pH 4-6 and the bound proteins are released by increasing the pH to 9-10 in an elution buffer.

Pre-Treatment of the Extract Medium After Extraction of the Precipitated Casein

The pH in the salt extract was adjusted to 4.5 with 1N hydrochloric acid and heated to 25° C.

The experiment was performed in a FastLine®10 expanded bed column (Ø=1 cm) product number 7010-0000, UpFront Chromatography.

The column was packed with 25 cm of adsorbent (19.6 ml) and equilibrated with demineralised water, 25° C.

The extract medium after extraction of the precipitated casein (salty whey) pH 4.5 was loaded onto the column with a linear flow rate of 10 cm/min. 1180 ml salty whey was loaded. The flow through was collected in fractions of 300 ml.

Bound impurities were eluted with 50 mN boric acid pH 9.0 (210 ml).

The lactoferrin was eluted from the adsorbent with 113 ml of 20 mN sodium hydroxide.

Figure 5:
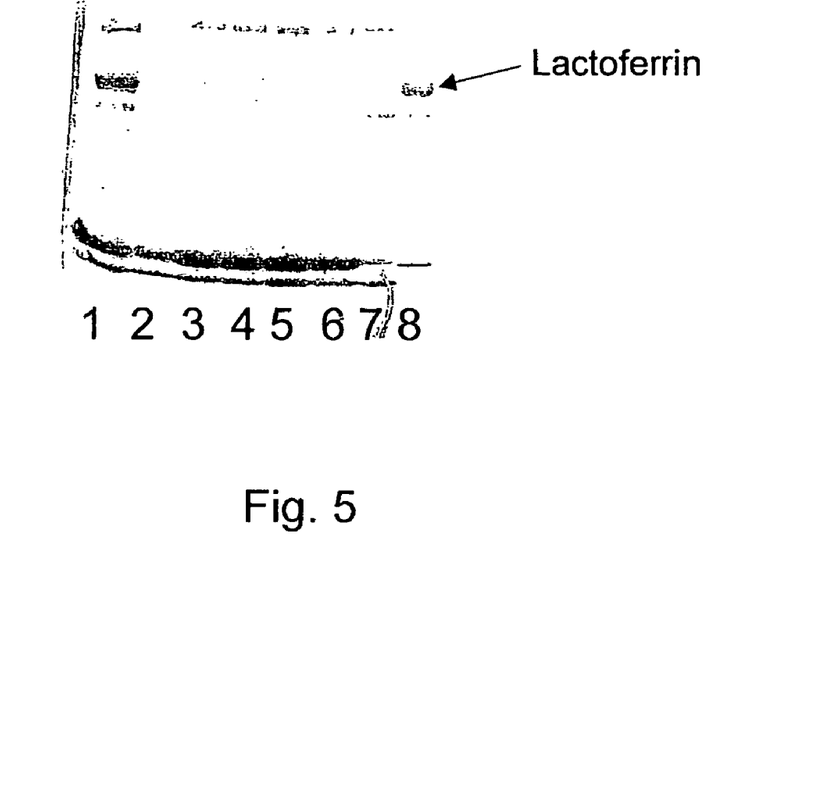
FIG. 5 shows the isolation of lactoferrin using expanded bed adsorption using a flow rate of 10 cm/min. Lane 1 shows the extraction medium after extraction of the precipitated casein, lane 2 shows a flow through fraction after 300 ml loaded, lane 3 shows a flow through fraction after 600 ml loaded, lane 4 shows a flow through fraction after 900 ml loaded, lane 5 shows a flow through fraction after 1180 ml loaded, lane 6 shows a pool of the flow through fractions, lane 7 shows the supernatant from a wash, lane 8 shows the eluted lactoferrin.

The content of protein in each fraction was determined with SDS-PAGE (non-reduced 4-20% tris-glycine gradient gel, Coomassie stained) See FIG. 5.

Results

The protein concentration in the eluate was measured spectrophotometrically at 280 nm:

| OD 280 nm in eluate | mg LF in eluate | Adsorbent capacity mg LF/ml adsorbent | Purity |
|---------------------|-----------------|---------------------------------------|--------|
| 4.69 | 477 | 24.3 | ++++ (approx. 90%) |

Calculation of mg LF in eluate:

$$(OD\ 280\ \text{in eluate} \times \text{volume of eluate} \times \text{purity}) / OD_{0.1\%,\ 280\ nm} OD_{0.1\%,\ 280\ nm} = 1.1$$

The adsorbent binds the lactoferrin from the extract medium after extraction of the precipitated casein in a ratio of at least 1:60 (60 ml extract per ml adsorbent). No LF is detected in the flow through fractions. See FIG. 5.

Example 4

Isolation of Lactoferrin from the Extract Medium After Extraction of the Precipitated Casein, by Using Expanded Bed Adsorption and Increased Loading Flow-Rate.

Refining of the extract medium after extraction of the precipitated casein comprising lactoferrin (LF) with expanded bed adsorption chromatography. The experiment is performed at a linear flow rate of 15 cm/min.

The extract medium after extraction of the precipitated casein was obtained from a local cheese production and was the same as in example 3.

All conditions except for the flow rate were the same as described in example 3.

Results

The lactoferrin was eluted from the adsorbent with 190 ml of 20 mN sodium hydroxide.

Figure 6:
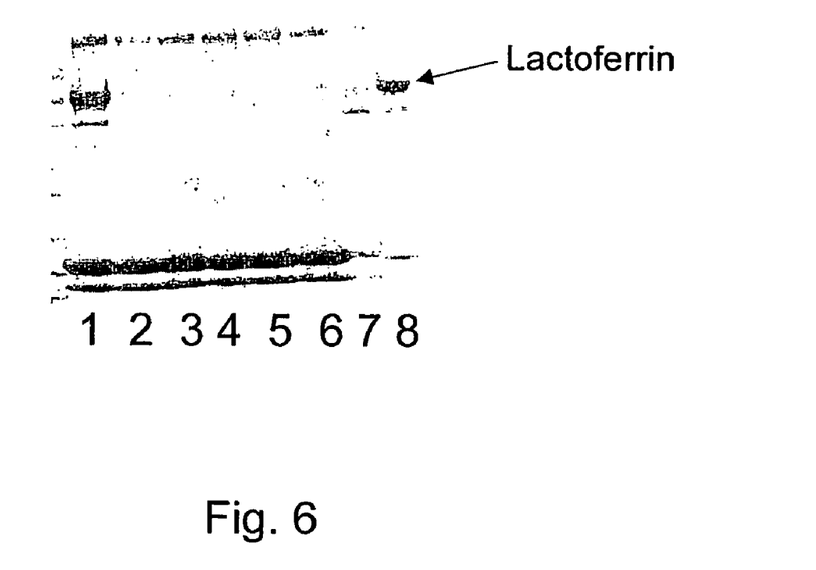
FIG. 6 shows the isolation of lactoferrin using expanded bed adsorption wherein the flow rate has been increased to 15 cm/min. Lane 1 shows the extraction medium after extraction of the precipitated casein, lane 2 shows a flow through fraction after 300 ml loaded, lane 3 shows a flow through fraction after 600 ml loaded, lane 4 shows a flow through fraction after 900 ml loaded, lane 5 shows a flow through fraction after 1180 ml loaded, lane 6 shows a pool of the flow through fractions, lane 7 shows the supernatant from a wash, lane 8 shows the eluted lactoferrin.

The content of protein in each fraction was determined with SDS-PAGE (non-reduced 4-20% tris-glycine gradient gel, Coomassie stained) See FIG. 6 below.

The protein concentration in the eluate was measured spectrophotometrically at 280 mM:

| OD 280 nm in eluate | mg LF in eluate | Adsorbent capacity mg LF/ml adsorbent | Purity |
|---|---|---|---|
| 2.68 | 458 | 23.4 | ++++ (approx. 90%) |

No LF was detected in the flow through fractions. See FIG. 6.

Example 5

Isolation of Lactoferrin from the Extract Medium After Extraction of the Precipitated Casein, by Using Expanded Bed Adsorption and Increasing Load Ratio.

Refining of the extract medium after extraction of the precipitated casein comprising lactoferrin (LF) with expanded bed adsorption chromatography. The experiment is performed at a load ratio of 1:100 (100 ml of raw material per ml of adsorbent) and a linear flow rate of 15 cm/min.

The extract medium after extraction of the precipitated casein was obtained from a local cheese production and were the same as in example 3.

The extract medium after extraction of the precipitated casein pH 4.5 was loaded onto the column with a linear flow rate of 15 cm/min. 1960 ml was loaded. All other conditions were as described in example 3.

Results

The lactoferrin was eluted from the adsorbent with 176 ml of 20 mN sodium hydroxide.

Figure 7:
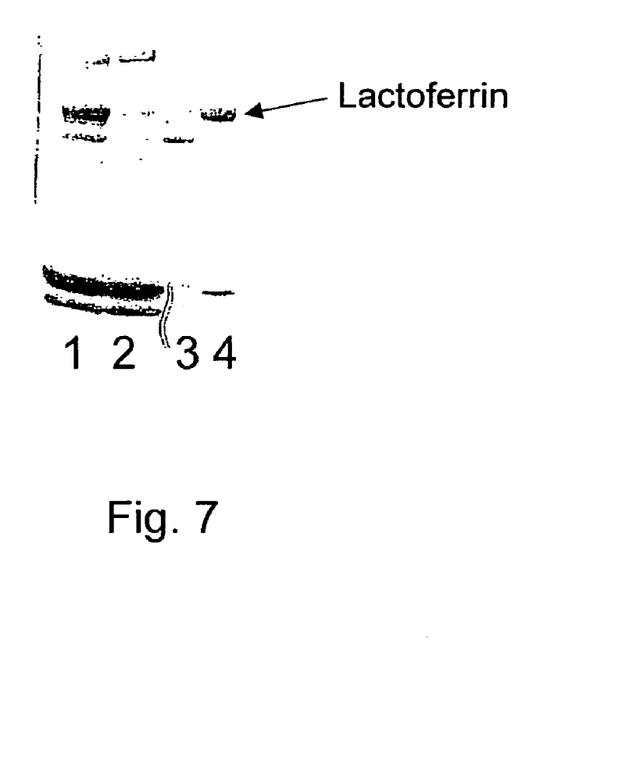
FIG. 7 shows the isolation of lactoferrin using expanded bed adsorption using an increased load ratio. Lane 1 shows the extraction medium after extraction of the precipitated casein, lane 2 shows a flow through fraction, lane 3 shows the supernatant from a wash, lane 4 shows the eluted lactoferrin.
Figure 8:
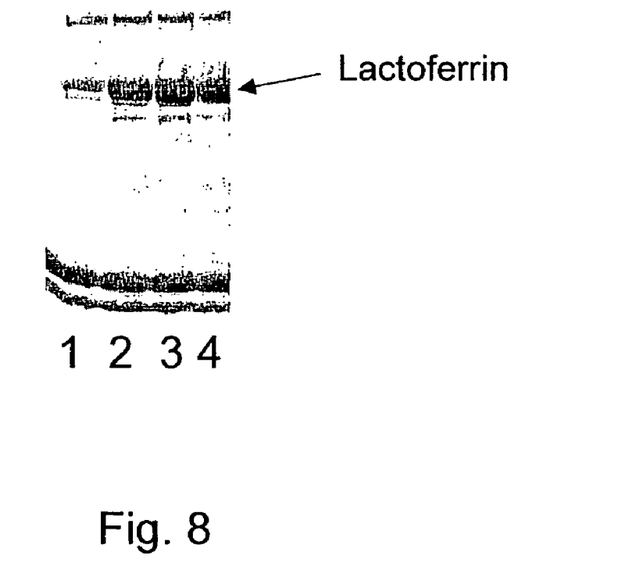
FIG. 8 shows the isolation of lactoferrin using expanded bed adsorption using different conductivity values and un-diluted extracts. Lane 1 shows a flow through fraction after a loading ratio of 1:15, lane 2 shows a flow through fraction after a loading ratio of 1:30, lane 3 shows a flow through fraction after a loading ratio of 1:45, lane 4 shows the raw material.
Figure 9:
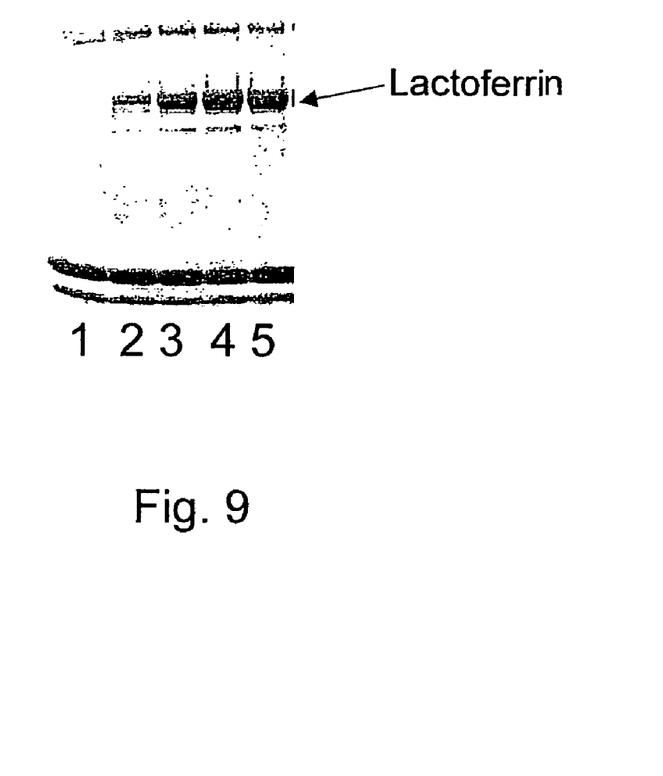
FIG. 9 shows the isolation of lactoferrin using expanded bed adsorption using different conductivity values and extracts diluted 2 times. Lane 1 shows a flow through fraction after a loading ratio of 1:12.5, lane 2 shows a flow through fraction after a loading ratio of 1:25, lane 3 shows a flow through fraction after a loading ratio of 1:37.5, lane 4 shows a flow through fraction after a loading ratio of 1:50, lane 5 shows the raw material.
Figure 10:
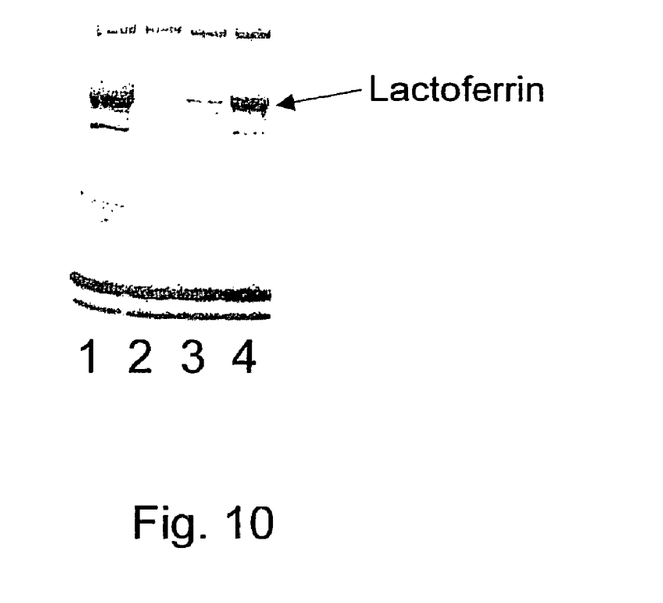
FIG. 10 shows the isolation of lactoferrin using expanded bed adsorption using different conductivity values and extracts diluted 3 times. Lane 1 shows the extract medium, lane 2 shows a flow through fraction after a loading ratio of 1:15, lane 3 shows a flow through fraction after a loading ratio of 1:30, lane 4 shows a flow through fraction after a loading ratio of 1:45.
Figure 11:
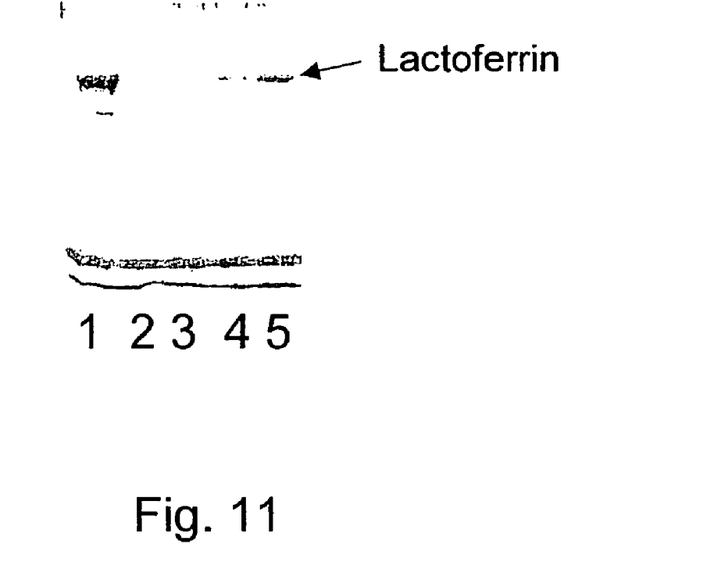
FIG. 11 shows the isolation of lactoferrin using expanded bed adsorption using different conductivity values and extracts diluted 3 times. Lane 1 shows the extract medium, lane 2 shows a flow through fraction after a loading ratio of 1:12.5, lane 3 shows a flow through fraction after a loading ratio of 1:25, lane 4 shows a flow through fraction after a loading ratio of 1:37.5, line 5 shows a flow through fraction after a loading ratio of 1:50.

The content of protein in each fraction was determined with SDS-PAGE (non-reduced 4-20% tris-glycine gradient gel, Coomassie stained) See FIG. 7 below.

The protein concentration in the eluate was measured spectrophotometrically at 280 mM:

| OD 280 nm in eluate | mg LF in eluate | Adsorbent capacity mg LF/ml adsorbent | Purity |
|---|---|---|---|
| 4.37 | 692 | 35.3 | ++++ (approx. 90%) |

The adsorbent binds more than 90% of the lactoferrin from the extract medium after extraction of the precipitated casein in a ratio of 1:100 (100 ml extract per ml adsorbent) at a linear flow rate of 15 cm/min.

Example 6

Isolation of Lactoferrin from the Extract Medium After Extraction of the Precipitated Casein, by Using Expanded Bed Adsorption and Different Conductivity Values.

Refining of the extract medium after extraction of the precipitated casein comprising lactoferrin (LF) with expanded bed adsorption chromatography. The binding capacity of the adsorbent is tested at different conductivity values of the extract medium.

An extract medium after extraction of precipitated casein was obtained from a cheese production facility and was analysed to have a pH of 5.4 and a conductivity of 120 mS/cm. The extract medium was obtained by washing the initially obtained cheese curd (precipitated casein) with a solution of sodium chloride whereby a solution of lactoferrin enriched salty whey was obtained by draining.

The adsorbent and the column used in this example were the same as those used in example 3 above.

Pre-Treatment of the Extract Medium After Extraction of the Precipitated Casein

The pH in the salt extract was adjusted to 4.5 with 1N hydrochloric acid. The extract was loaded onto the column un-diluted respectively diluted 2, 3 and 4 times with demineralised water.

Loading ratio was 1:50 (980 ml) for the un-diluted salty whey respectively 1960, 2940 and 3920 ml for the 2, 3 and 4 times diluted salty whey.

The extract medium after extraction of the precipitated casein pH 4.5 (salty whey) was loaded onto the column with a linear flow rate of 15 cm/min.

Bound impurities were eluted with 50 mN sodium citrate (205, 145, 102 and 226 ml respectively).

The lactoferrin was eluted from the adsorbent with 125, 110, 160 and 200 ml of 20 mN sodium hydroxide respectively.

The content of protein in each fraction was determined with SDS-PAGE (non-reduced 4-20% tris-glycine gradient gel, Coomassie stained) See FIG. 8-11 below.

Results

The protein concentration in the eluate was measured spectrophotometrically at 280 nm:

| Dilution of extract medium | Conductivity mS/cm* | Adsorbent capacity mg LF/ml adsorbent | Purity |
|---|---|---|---|
| un-diluted | 142 | 13.6 | ++++ (approx. 90%) |
| 1 + 1 | 73 | 34.5 | ++++ (approx. 90%) |
| 1 + 2 | 54 | 40.8 | ++++ (approx. 90%) |
| 1 + 3 | 37 | 45.4 | ++++ (approx. 90%) |

*Measured after pH-adjustment

Conclusion: The capacity of the adsorbent increases when the conductivity in the extraction media decreases.

Example 7

Isolation of Lactoferrin from the Extract Medium After Extraction of the Precipitated Casein, by Using Expanded Bed Adsorption and Reduced Temperature.

Refining of the extract medium after extraction of the precipitated casein comprising lactoferrin (LF) with expanded bed adsorption chromatography. Adsorption at 15° C.

The extract medium after extraction of the precipitated casein was obtained from a cheese production facility and was the same as in example 3.

All conditions except for the temperature at adsorption were the same as described in example 3.

Results

Bound impurities were eluted with 50 mN boric acid pH 9.0 (150 ml).

The lactoferrin was eluted from the adsorbent with 125 ml of 20 mN sodium hydroxide.

Figure 12:
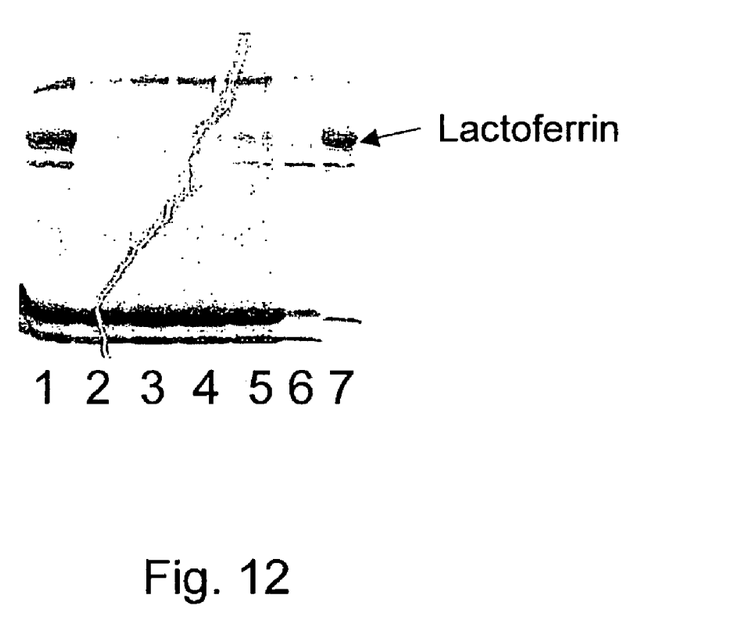
FIG. 12 shows the isolation of lactoferrin using expanded bed adsorption using a reduced temperature. Lane 1 shows the extraction medium after extraction of the precipitated casein, lane 2 shows a flow through fraction after 300 ml loaded, lane 3 shows a flow through fraction after 600 ml loaded, lane 4 shows a flow through fraction after 900 ml loaded, lane 5 shows a flow through fraction after 1180 ml loaded, lane 6 shows the supernatant from a wash, lane 7 shows the eluted lactoferrin.

The content of protein in each fraction was determined with SDS-PAGE (non-reduced 4-20% tris-glycine gradient gel, Coomassie stained) See FIG. 12 below.

The protein concentration in the eluate was measured spectrophotometrically at 280 nm:

| Temp. (° C.) | OD 280 nm in eluate | mg LF in eluate | Adsorbent capacity mg LF/ml adsorbent | Purity |
|---|---|---|---|---|
| 15 | 4.21 | 474 | 23.7 | ++++ (approx. 90%) |

The adsorbent binds practically all the lactoferrin from the extract medium after extraction of the precipitated casein in a ratio of at least 1:60 (60 ml extract per ml adsorbent) at 15° C.

The invention claimed is:

1. A process for isolating lactoferrin comprising:
   i. precipitating a casein precipitate from a product that comprises lactoferrin to a casein precipitate, whereby said lactoferrin associates with said casein precipitate to form a lactoferrin-casein adsorption product; and
   ii. extracting said lactoferrin-casein adsorption complex with an extraction medium, thereby releasing at least part of said lactoferrin from said lactoferrin-casein adsorption product into the extraction medium.

2. The process of claim 1, wherein said casein precipitate is obtained from milk, and wherein said product that comprises lactoferrin is milk, and further comprising after step (i) and before step (ii) the step of washing said lactoferrin-casein adsorption product with a washing solution to wash out at least part of undesired entrained whey proteins from the casein precipitate.

3. The process of claim 2, wherein the washing solution is drained off the casein precipitate.

4. The process of claim 1, wherein the lactoferrin containing extraction medium is separated from the casein precipitate by at least one method selected from the group consisting of draining, centrifugation, filtration and filter pressing.

5. The process of claim 1, wherein the extraction medium provides a change in at least one parameter selected from the group consisting of pH, ionic strength, salt content, hydrophobicity, charge, temperature and pressure.

6. The process of claim 1, wherein the extraction medium is at least one member selected from the group consisting of inorganic salts, organic salts, acids, and bases.

7. The process of claim 1, wherein the extraction medium comprises a final salt concentration in the range of 0.01-5N.

8. The process of claim 1, wherein the extraction medium has a pH in the range of 1-5.

9. The process of claim 1, wherein said product containing lactoferrin is obtained from an animal.

10. The process of claim 2 wherein said milk is obtained from a transgenic animal producing human or animal lactoferrin in their milk.

11. The process of claim 1, wherein the animal is selected from the group consisting of herd animals, cows, camels, buffaloes, pigs, horses, deer, sheep, goats, dogs and cats.

12. The process of claim 1, wherein lactoferrin is isolated by a batch operation or by continuous operation.

13. The process of claim 4, wherein the lactoferrin in said extraction medium separated from said casein precipitate is further isolated by at lease one method selected from the group consisting of clarification, concentration and purification.

14. The process of claim 13, wherein said further isolated lactoferrin is clarified by at least one method selected from the group consisting of filtration, membrane filtration, centrifugation and sedimentation.

15. The process of claim 13 or 14, wherein lactoferrin is concentrated by at least one method selected from the group consisting of membrane filtration, ultrafiltration, nanofiltration, reversed osmosis, evaporation and precipitation.

16. The process of claim 15, wherein said concentrated lactoferring is purified by at least one adsorption technique selected from the group consisting of ion exchange, hydrophobic adsorption, affinity adsorption, mixed mode ligand adsorption, metal chelate adsorption, reversed phase adsorption, gel filtration and precipitation.

17. The process of claim 16, wherein the adsorption technique is performed in an expanded bed mode, a packed bed mode or both.

18. The process of claim 16, wherein said lactoferrin is adsorbed by a resin at a pH in the range of 3-7.

19. The process of claim 16, wherein said lactoferrin is eluted from a resin by increasing pH.

20. The process of claim 19, wherein the pH for elution of said lactoferrin adsorbed to a resin is in the range of 8-13.

21. The process of claim 1, wherein said casein precipitate is obtained from dairy product.

22. The process of claim 1, wherein said lactoferrin is isolated from a casein precipitate obtained from a casein and/or caseinate production.

23. The process of claim 1, wherein said lactoferrin is isolated from a casein precipitate obtained from a cheese production.

24. A lactoferrin enriched extract comprising lactoferrin isolated according to the process of claim 1.

25. A composition comprising the lactoferrin enriched extract of claim 24.

26. A method for preserving food products comprising combining the lactoferrin enriched extract of claim 24 with a food product.

27. The method of claim 26, further comprising subjecting said combined lactoferrin enriched extract to a preparation step.

28. The method of claim 26 or 27, wherein said food product is a meat product.

* * * * *